United States Patent [19]

Axelrod et al.

[11] Patent Number: 4,680,342

[45] Date of Patent: Jul. 14, 1987

[54] FLAME RESISTANT ALKENYL AROMATIC COMPOUNDS AND POLYMERS CONTAINING CHEMICALLY BONDED PHOSPHORUS AND BLENDS WITH POLYPHENYLENE ETHER

[75] Inventors: Robert J. Axelrod, Glenmont; Glenn D. Cooper, deceased, late of Delmar, by Rose H. Cooper, executrix, all of N.Y.

[73] Assignee: General Electric Company, Selkirk, N.Y.

[21] Appl. No.: 803,448

[22] Filed: Dec. 2, 1985

Related U.S. Application Data

[62] Division of Ser. No. 566,341, Dec. 28, 1984, abandoned.

[51] Int. Cl.$^4$ .................... C08F 8/00; C08F 130/02; C08L 71/04
[52] U.S. Cl. .................................... 525/132; 526/278
[58] Field of Search .................... 526/278; 525/132

[56] References Cited

U.S. PATENT DOCUMENTS

| | | | |
|---|---|---|---|
| 3,051,740 | 8/1962 | Abromo et al. | 526/278 |
| 3,725,365 | 4/1973 | McKinley et al. | 526/278 |
| 3,991,134 | 11/1976 | Kraft et al. | 525/132 |
| 4,433,088 | 2/1984 | Haaf et al. | 525/132 |

*Primary Examiner*—Joseph L. Schofer
*Assistant Examiner*—Peter F. Kulkosky
*Attorney, Agent, or Firm*—Hedman, Gibson, Costigan & Hoare

[57] ABSTRACT

Flame retardant alkenyl aromatic compounds which are vinylbenzyl diaryl phosphine oxides and a method for their preparation are described. They may be polymerized into higher molecular weight flame retardant materials which, in turn, may be admixed with polyphenylene ether resins to form thermoplastic flame resistant molding compositions. The present materials are more resistant to losses in the flame retardancy upon thermal processing, e.g., molding, because the active flame retardant agent, phosphorus, is chemically bound to the polymeric matrix.

9 Claims, No Drawings

FLAME RESISTANT ALKENYL AROMATIC COMPOUNDS AND POLYMERS CONTAINING CHEMICALLY BONDED PHOSPHORUS AND BLENDS WITH POLYPHENYLENE ETHER

This is a division of application Ser. No. 566,341 filed Dec. 28, 1984, now abandoned.

BACKGROUND OF THE INVENTION

Thermoplastic compositions of polyphenylene ether-(oxide)resin and poly(alkenyl aromatic)resin have been described by Cizek, in U.S. Pat. No. 3,383,435, and elsewhere in the patent literature, and have been known in the art for some time. These compositions are moldable into a wide variety of shaped articles which are characterized by good physical properties but may be unsuitable for some applications because of flammability, principally due to the poly(alkenyl aromatic) portion of the composition. For articles requiring better flame resistance, it has become common practice to add flame retardant agents to the blend of polymers. Many types of such additives have been proposed. Examples include halogenated aromatic compounds, halogenated organic compounds in admixture with antimony oxide, aromatic phosphates, and phosphonate compounds, halogen-containing compounds in admixture with phosphorus compounds, and halogenated polymers, e.g., chlorinated or brominated polystyrene or polycarbonate. Some of the descriptive patent literature includes U.S. Pat. No. 3,809.729 (Reinhard), U.S. Pat. No. 3,639,506 (Haaf), U.S. Pat. No. 4,191,685 (Haaf and Lee, Jr.) and U.S. Pat. No. 4,355,126 (Haaf and Reinhard).

Knoth, Jr. et al. in U.S. Pat. No. 3,975,447 disclose a process for making certain aromatic phosphine oxides which are useful as flame retardants for organic polymers. The process involves reacting a benzylic halide with a diarylhalophosphine, in a basic medium, to produce a benzyl diaryl phosphine oxide.

Cabasso, et al. in U.S. Pat. No. 4,073,754 describe flame resistant polymer alloys which are blends of a phosphorus-containing polystyrene, or polyphenylene oxide and a second polymer selected from among cellulose esters, unsaturated polyester resins and polystyrene resins. The active flame retardant ingredients are, more specifically, phosphonate groups which are pendent on the polystyrene or polypheylene oxide polymer chains, that is, groups of the formula $PO(OR)(OR_1)$, in which R and $R_1$ are alkyl or aryl.

A difficulty which has been encountered with low molecular weight flame retardant additives, and with triphenyl phosphate and other aromatic phosphates in particular, is that these compounds tend to volatilize when the polymer blend is molded or otherwise processed at elevated temperatures. As a result, significant amounts of the additive may migrate to the surface, where they remain or are lost to the atmosphere. This, in turn, can lead to losses in the flame retardancy and the appearance of unsightly blemishes on the surface of the molded article, either of which is undesirable.

SUMMARY OF THE INVENTION

The discovery has now been made of certain phosphoryl-containing alkenyl aromatic compounds which can be polymerized into a flame resistant phosphoryl-containing poly(alkenyl aromatic)resin, and, further, that the latter can be admixed with polyphenylene ether(oxide)resin to form a blend which exhibits substantially better flame retardance than a similar blend made with the same amount of phosphorus but added in the form of a low molecular weight agent, for example, an aromatic phosphate.

More specifically, the phosphorylated alkenyl aromatic monomers of this invention are those compounds of the formula

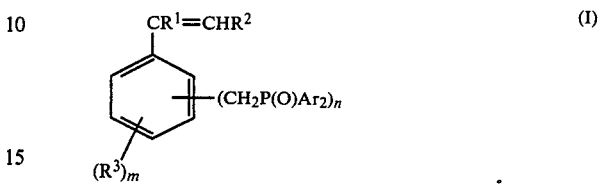
(I)

in which $R^1$ and $R^2$ independently may be alkyl or alkenyl of from 1 to 6 carbon atoms, or hydrogen; $R^3$ may be halogen, hydrogen or lower alkyl or alkenyll of from 1 to 6 carbon atoms; Ar is a mono- or di- carbocyclic aromatic radical that can be substituted with up to 5 substituents selected from among halogen and alkyl of from 1 to 3 carbon atoms; m is 0 or a whole number from 1 to 3; and n is a whole number from 1 to 3.

The invention also comprises thermoplastic polymers having units of the formula

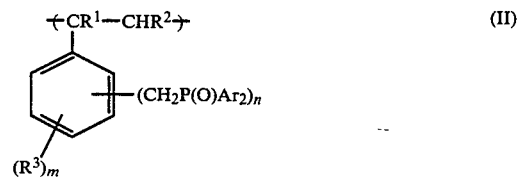
(II)

in which $R^1$, $R^2$, $R^3$, Ar, m and n are as above, as well as blends of such polymers with polyphenylene ether resins.

It is noteworthy that a phosphoryl-containing poly(alkenyl aromatic) prepared in the aforementioned manner, that is, by polymerization from a phosphorylated comonomer, is heat stable.

It is important also that the present kinds of blends, besides having good flame retardancy behavior, possess excellent resistance to loss of flame retardancy upon thermal processing, e.g., molding, because there is no larger amount of volatile flame retardant additive to lose. The flame retardance is provided by phosphorus groups which are chemically bound to a polymeric component in the blend.

DETAILED DESCRIPTION OF THE INVENTION

The phosphoryl-containing alkenyl aromatic monomers of this invention, Formula I above, may be prepared by reacting an alkenyl aromatic halide of the formula

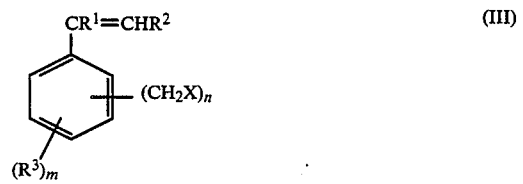
(III)

in which $R^1$, $R^2$, $R^3$, m and n are as defined above, and X is chloro, bromo or iodo, with a diarylhalophosphine of the formula $$Ar_2PX^1 \qquad (IV)$$

in which Ar is as defined above, and $X^1$ is chloro, bromo or iodo, in the presence of an alkali metal hydroxide or alkaline earth metal hydroxide.

Suitable alkenyl aromatic halides for use in accordance with this invention, and which are within the above formula, include 4-chloromethyl styrene(4-vinyl benzyl chloride), 2-chloromethyl styrene, 4-methyl-2-chloromethyl styrene, 2-methyl-4-chloromethyl styrene, 2-chloro-4-chloromethyl styrene, 4-bromomethyl styrene, 2-bromomethyl styrene, 4-methyl-2-bromomethyl styrene, and so forth.

Diarylhalophosphines suitable for use in accordance with this invention and within the above formula include diphenylchlorophosphine, bis(p-methylphenyl)-chlorophosphine, diphenyliodophosphine, phenylpentafluorophenylbromophosphine, bis(p-chlorophenyl)-bromophosphine, diphenylbromophosphine, bis(p-ethylphenyl)chlorophosphine, bis(p-n-propylphenyl)chlorophosphine, bis(p-bromophenyl)chlorophosphine, bis(m-bromophenyl)chlorophosphine, bis(2,4,5-trimethylphenyl)chlorophosphine, and bis(1-naphthyl)-chlorophosphine. Especially preferred is diphenylchlorophosphine.

Suitable alkali metal hydroxides include sodium, lithium or potassium hydroxides. Suitable alkaline earth metal hydroxides include magnesium, calcium and barium hydroxides.

The reaction is preferably carried out in the presence of water or an organic solvent, or a mixture of both. Suitable solvents include relatively inert organic liquids such as xylene, dimethyl ether, diethyl ether, dimethoxyethane, tetrahydrofuran, acetonitrile, propionitrile, benzonitrile, dimethylformamide, dimethylacetamide, diethylacetamide, methanol, ethanol, butanol, tetramethylene sulfone, ethyl benzyl sulfone, diphenyl sulfone, dibenzyl sulfone, dimethyl sulfoxide, tetramethylene sulfoxide, diphenyl sulfoxide, dibenzyl sulfoxide, benzene, o-dichlorobenzene, and pyridine.

Relative proportions of the respective starting materials may vary broadly. The reaction will proceed rapidly, and because it is exothermic there is no need for externally applied heat. Preferably, the temperature of the reaction mixture is maintained within the range from about 0° to about 50° C. This may be done by use of an appropriate cooling means, for example, a cooling jacket surrounding the reaction vessel, or by use of a solvent which boils at about the desired temperature of reaction and running the reaction under reflux.

The reaction is preferably conducted at atmospheric pressure, but subatmospheric or superatomospheric pressures may be employed.

In general, reaction times of from about 30 minutes to about 4 hours are sufficient, with the yield of the phosphorylated end product increasing with time.

In many cases, the product will precipitate from the reaction mixture. The precipitate is separated and recovered by filtration or other conventional means, and it may then by washed with water or a weak solvent to free it of hydroxide and halide ions, as well as any other contaminants. Further purification may be accomplished by recrystallization, if desired. In those cases where precipitation does not occur, the product can be recovered by use of other conventional methods, for instance, by evaporation or distillation of the solvent, by extraction with a solvent, or by the addition of a nonsolvent which induces precipitation of the product.

As mentioned, the compound of Formula I may be reacted to obtain a polymer comprised of units of Formula II, above. Procedures similar to alkenyl aromatic polymerization can be employed to this end. Preferably, a compound in accordance with Formula I, which may be described as a vinyl-substituted benzyl diaryl phosphine oxide, is reacted with an amount of a non-phosphorus containing alkenyl aromatic compound to form the corresponding copolymer. This may be accomplished, for instance, by heating a suspension of a mixture of the comonomers in the presence of a radical forming catalyst, for instance, an organic peroxide, and preferably under an inert atmosphere, for example, nitrogen. The copolymer precipitates and is separated and recovered. The resulting copolymer preferably will have an intrinsic viscosity of from about 0.3 to about 0.9 deciliters per gram as measured in solution in chloroform at 30° C.

Desirably, the resultng copolymer has a phosphorus content of from about 0.4 to about 1.0 weight percent. Even those copolymers having smaller phosphorus contents within this range are still highly flame resistant.

The phosphoryl-containing alkenyl aromatic polymer is especially useful in blends with polyphenylene ether resins, such as those disclosed by Hay in U.S. Pat. Nos. 3,306,874 and 3,306,875, and by Stamatoff in U.S. Pat. Nos. 3,257,357 and 3,257,358.

Special mention is made of polyphenylene ether resins which are homopolymers or copolymers containing units of the formula

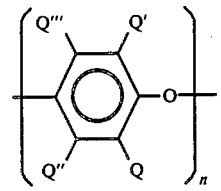

in which Q, Q', Q" and Q''' are, independently, selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20, and more usually at least 50.

The polypheylene ther resins are, in general, self-condensation products of monohydric, monocyclic phenols produced by reacting the phenols with oxygen in the presence of complex metal catalysts, with the molecular weight being controlled by the reaction time, longer times providing a higher average number of repeating units. Particular procedures are known to those skilled in the art and are described in the patent literature, including the Hay and Stamatoff patents mentioned above.

Suitable phenolic monomers include but are not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2-methyl-6-cyclohexylphenol; 2-methyl-6-tolylphenol; 2-methyl-6-methoxyphenol; 2-methyl-6-butylphenol; 2,6-dimethoxyphenol; 2,3,6-trimethylphenol; 2,3,5,6-tetramethylphenol; and 2,6-diethoxyphenol.

Some of the polymers which can be produced and which are within the above formula are: poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Also included within the above formula are copolymers prepared from mixtures of phenolic monomers. Special mention is made of those based on the reaction of 2,6-dimethylphenol with other phenols, for example, with 2,3,6-trimethylphenol or 2-methyl-6-butylphenol, to produce the corresponding copolymer, for example, poly(2,6-dimethyl-co-2,3,6-trimethylphenol), poly(2,6-dimethyl-co-2-methyl-6-butylphenol), and so forth.

Especially preferred for use in this invention are homopolymers having alkyl substituents in the two positions ortho to the oxygen ether atom, that is, those of the above formula in which Q and Q' are alkyl, and particularly alkyl having from 1 to 4 carbon atoms. Most preferred is poly(2,6-dimethyl-1,4-phenylene ether).

The poly(alkenyl aromatics) of this invention and the above mentioned polyphenylene ether resins are compatibly admixable in widely variant proportions, in accordance with the known behavior of polystyrene and polyphenylene ether generally, and the resulting blends can be extruded, molded, calendered, etc. into articles of various shapes and sizes which, in general, are useful for the same purposes for which polyphenylene ether-polystyrene blends have become known. Because of the outstanding flame retardancy of the present kinds of blends, they are especially useful in commercial applications where flame resistance is a desirable feature, for example, as components in electrical products.

DESCRIPTION OF THE SPECIFIC EMBODIMENTS

The invention is illustrated in the following examples, which are presented for instructional purposes only.

EXAMPLE 1

This example illustrates the preparation of vinylbenzyl diphenyl phosphine oxide, a phosphorylated monomer in accordance with this invention.

Fifty five hundredths of a mole of 4-vinyl benzyl chloride, 0.5 mole of diphenyl chlorophosphine and 750 milliliters of tetrahydrofuran were placed in a 3-necked round bottom flask, and the contents were chilled to a temperature of 10° C., using an ice bath. Sodium hydroxide in an amount 1.9 moles, in 150 milliliters of water, was added dropwise, with stirring, to the mixture in the flask. The exothermic reaction was kept at a temperature of 10° C., for thirty minutes. After an additional period of about thirty minutes, a precipitate formed. The contents of the flask were filtered to separate the precipitate, which was then washed with water until the effluent had a pH of 7. The yield was 55 grams; m.p. 223° C.; proton Nmr:

at 3.7 ppm, CH=CH$_2$ multiplet at 5.5 ppm, and aromatic multiplet at 7.6 ppm.

EXAMPLE 2

This example illustrates the preparation of a copolymer of styrene with vinylbenzyl dipheyl phosphine oxide in accordance with the invention.

In a stainless steel autoclave, six hundred grams of styrene were heated with stirring to 100° C., under a nitrogen blanket, after which 38 grams of 4-vinylbenzyl diphenyl phosphine oxide prepared as in Example 1 were added, followed by 0.8 grams of tert-butyl peracetate. The mixture was heated under nitrogen for four additional hours at 100° C. A solution of 3 grams of poly(vinyl alchol) and 2.25 grams of gelatin in 1200 milliliters of water was added, along with 6.0 grams of tert-butyl peroxide. The resulting mixture was stirred at a speed sufficient to suspend the organic phase and was then heated for 2 hours at 120° C., for one hour at 140° C., and for 2½ hours at 155° C., respectively. The resultant copolymer beads were drawn off, filtered, washed several times with water, and dried. The product had an intrinsic viscosity of 0.78 deciliters per gram as measured in solution in chloroform at 30° C. The phosphorus content was 0.58%.

EXAMPLE 3

This example illustrates a blend of a phosphorus-containing poly(alkenyl aromatic) resin and a polyphenylene ether resin, in accordance with the invention.

A mixture of 70 parts by weight of poly(2,6-dimethyl-1,4-phenylene ether)resin (PPO ®, General Electric Co.), 30 parts by weight of the styrene copolymer of Example 2, 1.5 parts by weight of polyethylene, 0.15 part by weight of zinc sulfide and 0.15 part by weight of zinc oxide was extruded, and the extrudate was molded into standard ⅛ inch by 1/16 inch test pieces using a screw-type injection molding machine.

A control mixture of the same ingredients in the same amounts was also prepared and molded, using the same conditions, except that the styrene copolymer was replaced with an equal amount of a non-phosphorylated polystyrene homopolymer and enough triphenyl phosphate to equalize the phosphorus content with that of the other blend.

The two molded blends were evaluated for flame retardancy using the procedure of the Underwriters Laboratories' Test Bulletin No. 94, and the results are reported in the Table below. The heat distortion temperature (HDT) is also recorded.

TABLE

| Blend | 1/16-inch Test Specimen | | ⅛-inch Test Specimen | | HDT, °F. |
|---|---|---|---|---|---|
| | Rating | Ave. Burn Time, Sec. | Rating | Ave. Burn Time, Sec. | |
| Copolymer (This invention) | V-1 | 14.5 | V-O | 2.9 | 307 |
| Control, with TPP | Failed | 17.2 | V-1 | 6.1 | 294 |

As can be seen, the blend in accordance with the invention, containing polystyrene in which the phosphorous is chemically bonded, had substantially better flame resistance than the control blend and, in addition, a higher heat distortion temperature.

All of the patents mentioned above are incorporated herein by reference.

Obviously, other modifications and variations are possible in view of the above disclosure. It is to be understood, therefore, that changes may be made in the particular embodiments shown which are within the scope of the invention defined by the appended claims.

What is claimed is:

1. A flame retardant polymer comprising units of the formula

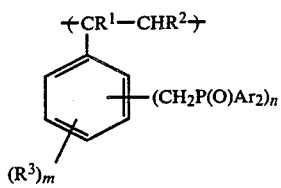

in which $R^1$ and $R^2$ are independently selected from the group consisting of alkyl having from 1 to 6 carbon atoms, alkenyl having from 1 to 6 carbon atoms, and hydrogen; $R^3$ is selected from the group consisting of alkyl having from 1 to 6 carbon atoms, alkenyl having from 1 to 6 carbon atoms, halogen and hydrogen; Ar is selected from the group consisting of monocarbocylic and dicarbocyclic aromatic radicals unsubstituted and substituted with up to 5 substituents selected from among halogen and alkyl having from 1 to 3 carbon atoms; m is zero or a whole number from 1 to 3; and n is a whole number from 1 to 3.

2. A polymer according to claim 1, which comprises units of the formula recited with units of a nonphosphorous containing alkenyl aromatic compound.

3. A polymer according to claim 2, in which the non-phosphorous containing alkenyl aromatic compound is styrene.

4. A polymer according to claim 2, which is a copolymer of styrene and 4-vinylbenzene diphenyl phosphine oxide.

5. A polymer according to claim 1, having a phosphorouss content of from about 0.4 to about 1.0 weight percent.

6. A flame retardant thermoplastic composition, comprising an admixture of a polymer according to claim 1 with a polyphenylene ether resin.

7. A composition according to claim 6, in which the polyphenylene ether resin is a homopolymer or copolymer having units of the formula

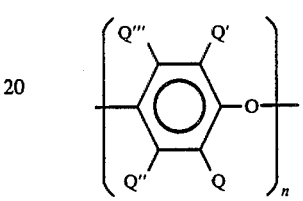

in which Q, Q', Q" and Q'" are, independently, selected from the group consisting of hydrogen, halogen, hydrocarbon radicals, halohydrocarbon radicals, hydrocarbonoxy radicals, and halohydrocarbonoxy radicals; and n represents the total number of monomer units and is an integer of at least about 20.

8. A composition according to claim 6, in which the polyphenylene ether resin is poly(2,6-dimethyl-1,4-phenylene ether)resin.

9. A composition according to claim 6, which comprises an admixture of 4-vinylbenzyl diphenyl phosphine oxide and poly(2,6-dimethyl-1,4-phenylene ether)resin.

* * * * *